United States Patent Office 3,318,882
Patented May 9, 1967

3,318,882
2-AMINO-5-DILOWERALKYL SULFAMOYL-N,N-DISUBSTITUTED BENZAMIDES
Paul Schmidt, Therwil, Alberto Rossi, Oberwil, Basel-Land, Kurt Eichenberger, Basel, and Max Wilhelm, Allschwil, Switzerland, assignors to Ciba Corporation, New York, N.Y., a corporation of Delaware
No Drawing. Filed June 2, 1964, Ser. No. 372,086
Claims priority, application Switzerland, June 5, 1963, 7,027/63; Apr. 2, 1964, 4,196/64; May 6, 1964, 5,900/64
16 Claims. (Cl. 260—247.1)

The present invention relates to new anthranilic acid amides. In particular it concerns new N:N-aliphatic disubstituted 5-dialkylsulphamylanthranilic acid amides having an unsubstituted or acylated amino group and their salts.

Substituents of the carbamyl group are, in particular monovalent or bivalent lower aliphatic hydrocarbon radicals which may also be interrupted by hetero atoms, such as oxygen, nitrogen or sulfur atoms, and/or substituted by functional groups, such as hydroxyl or amino groups. As monovalent hydrocarbon radicals of this kind there may be mentioned, for example, lower alkyl, such as methyl, ethyl, n-propyl, isopropyl, straight-chain or branched butyl, pentyl, hexyl or heptyl bound in any position, lower alkenyl, such as allyl or methallyl. Corresponding radicals interrupted by the said hetero atoms are, for example, lower alkoxy-alkyl, alkylmercapto-alkyl or mono- or dialkylaminoalkyl, such as 2-methoxy-ethyl, 2-ethoxyethyl, 3-methoxypropyl, 2-methylmercapto-ethyl, or dimethyl-, methylethyl- or diethylamino-ethyl or -propyl; radicals substituted by functional groups are, for example, lower hydroxy- or aminoalkyl, such as 2-hydroxy- or -amino-ethyl or -propyl. Bivalent aliphatic radicals of the said kind are, for example, lower alkylene, such as butylene-(1:4), pentylene-(1:5), hexylene-(1:5), hexylene-(1:6) or heptylene-(2:6), or lower oxa-, aza- or thia-alkylene, such as 3-oxa-, 3-aza- or 3-thiapentylene-(1:5) or -hexylene-(1:6), 3-lower alkyl-3-azapentylene-(1:5) such as 3-methyl-, 3-ethyl- or 3-propyl-3-azapentylene-(1:5) or -hexylene-(1:6), or 4-methyl-4-azaheptylene-(2:6) or radicals of this kind substituted by functional groups, such as 3-(hydroxy-lower alkyl)-3-azapentylene-(1:5), e.g., 3 - (β - hydroxyethyl) - 3 - aza-pentylene-(1:5).

The dialkylsulphamyl group in 5-position contains, for example, the above-mentioned lower alkyl groups. The amino group present in 2-position may also be substituted by an acyl radical. As acyl radicals there may be mentioned, in particular, radicals of aliphatic, araliphatic or aromatic carboxylic acids, for example carbo-lower alkoxy radicals, such as methoxy- or ethoxycarbonyl radicals, fatty acid radicals, for example lower alkanoyl radicals, such as acetyl, propionyl, butyryl, pivalyl, valeroyl, caproyl, oenanthoyl, lauroyl, or phenyl-lower alkanoyl radicals, for example phenylacetyl radicals or benzoyl radicals which may be substituted in the aromatic nuclei, for example by lower alkyl groups, such as those mentioned above, lower alkoxy groups, for example methoxy, ethoxy, butoxy or pentyloxy groups, halogen atoms, such as fluorine, chlorine or bromine atoms, or trifluormethyl groups.

The new compounds may be substituted in 3-, 4- and/or 6-position. Substituents for these positions may be, in particular, halogen atoms, such as fluorine or chlorine atoms, trifluoromethyl groups, lower alkyl groups, for example those mentioned above or lower alkoxy groups such as methoxy, ethoxy, propoxy or butoxy groups.

The new compounds have valuable pharmacological properties, in particular anti-inflammatory and anti-allergic properties. Thus, for example, in rats, guinea pigs and rabbits, they suppress inflammatory processes and allergic reactions. Accordingly, they can be employed as anti-phlogistics and anti-allergics. Furthermore, they reduce blood pressure, for example in animal experiments on the rat, and may be used as hypotensives. They are also valuable intermediate products for the manufacture of other substances, for example of pharmacologically active substances. Particularly valuable are compounds of the formula

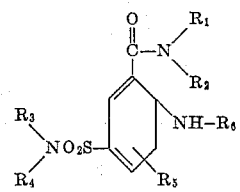

in which $R_1$ and $R_2$ stand for lower alkyl or together stand for lower alkylene, monooxa-, aza- or -thia-lower alkylene, $R_3$ and $R_4$ for lower alkyl radicals, $R_5$ in particular for hydrogen, but also for lower alkyl, chloro- or trifluoromethyl, and $R_6$ for hydrogen or the acyl radical of an aliphatic, aliphatic or aromatic carboxylic acid with 10 carbon atoms at the most.

The compounds of the formula

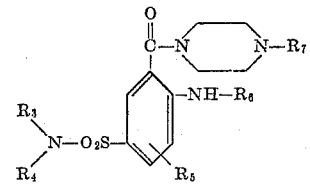

in which $R_3$ and $R_4$ each represents a lower alkyl radical, $R_5$ a lower alkyl radical, a chlorine atom, a trifluoromethyl group or, more especially, a hydrogen atom, $R_6$ a hydrogen atom, a lower alkanoyl radical or a benzoyl radical which may be substituted by a lower alkyl radical, a halogen atom, trifluoromethyl group and/or a lower alkoxy group, and $R_7$ represents a hydrogen atom, a lower alkyl radical or a lower hydroxyalkyl radical, and particularly 5-(dimethylsulfamyl) - anthranilic acid-(N'-methyl-piperazide) and 5-(dimethylsulfamyl)-anthranilic acid-[N' - (β - hydroxyethyl)-piperazide], are particularly outstanding on account of their anti-inflammatory effect.

The compounds of the formula

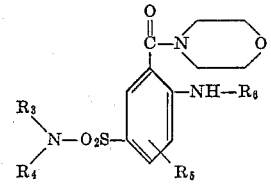

in which $R_3$ and $R_4$ each represents a lower alkyl radical, $R_5$ a lower alkyl radical, a chlorine atom, a trifluoromethyl group or more particularly a hydrogen atom, and $R_6$ represents a hydrogen atom, a lower alkanoyl radical or a benzoyl radical which may be substituted by a lower alkyl radical, a halogen atom, a trifluoromethyl group and/or a lower alkoxy group, and more especially 5-(dimethylsulfamyl)-anthranilic acid morpholide, are especially valuable on account of their hypotensive effect.

The new compounds are prepared by methods known per se. For example they are obtained when an anhydride of a 5-(dialkylsulfamyl)-anthranilic acid having a free or acylated amino group is reacted with a secondary amine containing only aliphatic radicals or, in an N:N-aliphatically disubstituted 2-nitro-5-(dialkylsulfamyl)-benzoic acid amide, the nitro group is converted by reduction into the amino group and, if desired, a resulting 2-amino compound is acylated or a resulting 2-acylamino compound is hydrolysed.

Anhydrides of 5-(dialkylsulfamyl)-anthranilic acids or their acyl derivatives are, for example, pure or mixed anhydrides, for example mixed anhydrides with carbonic acid monoalkyl esters, such as carbonic acid monoethyl or isobutyl esters, or inner anhydrides, for example inner anhydrides of N-acyl-5-(dialkylsulfamyl)-anthranilic acids, that is to say corresponding 6-(dialkylsulfamyl)-4-H-3:1-benzoxazine-4-ones, for example inner anhydrides of N-acetyl-5-(dialkylsulfamyl)-anthranilic acids or 5-(dialkylsulfamyl)-isatoic anhydrides, or inner anhydrides of N-(α-hydroxyalkyl)-5-(dialkylsulfamyl)-anthranilic acids, for example N-hydroxymethyl-5-(dialkylsulfamyl)-anthranilic acids.

The reaction of the said compounds with the secondary amine is effected in a manner known per se, in particular in the presence of a solvent or diluent, in the presence or absence of reaction accelerators, at room temperature or preferably at an elevated temperature and, if necessary, in a closed vessel under pressure and/or under an inert gas, for example nitrogen.

When inner anhydrides of N-(α-hydroxyalkyl)-5-(dimethylsulfamyl)-anthranilic acids are used as starting materials, the hydroxyalkyl group is split off during the reaction. When inner anhydrides of N-acyl-5-(dialkylsulfamyl)-anthranilic acids are used as starting materials, the reaction conditions may be chosen, if desired, so that the acyl radical is split off simultaneously.

The reduction of the 2-nitro group is effected by known methods. It may, for example, be carried out by nascent hydrogen (for example with iron and hydrochloric acid or with aluminum amalgam) or with catalytically activated hydrogen, such as hydrogen in the presence of a platinum, nickel or palladium catalyst.

Further substituents can be introduced into the compounds obtained, or existing substituents present can be modified or split off, by known methods. Thus, 2-amino compounds obtained can be acylated, for example, by reaction with reactive functional derivatives of carboxylic acids, such as anhydrides or halides, or 2-acylamino compounds obtained can be hydrolyzed in particular by reaction with alkaline agents.

The said reactions are carried out in conventional manner in the presence or absence of solvents or diluents, acid or basic condensing agents and/or catalysts at lowered, ordinary or elevated temperature, if required in a closed vessel under elevated pressure and/or under an inert gas atmosphere.

Depending on the conditions of the process and the starting materials, the final substances are obtained in free form or in the form of their salts, which is likewise included in the invention. Thus, for example, basic, neutral, acid or mixed salts, and if required also hemi-, mono-, sesqui- or polyhydrates thereof can be obtained. The salts of the final substances can be converted into the free bases in a manner known per se, for example with alkalies or ion exchangers. From these free bases salts can be recovered by reaction with organic or inorganic acids, in particular those which are suitable for the formation of therapeutically usable salts. As such acids there may be mentioned, for example, hydrohalic acids, sulphuric acids, phosphoric acids, nitric acid, perchloric acid; aliphatic, alicyclic, aromatic or heterocyclic carboxylic or sulphonic acids, such as formic, acetic, propionic, succinic, glycollic, lactic, malic, tartaric, citric, ascorbic, maleic, hydroxymaleic or pyroracemic acid; phenylacetic, benzoic, p-aminobenzoic, anthranilic, p-hydroxybenzoic, salicylic, p-aminosalicylic or embonic acid, methanesulphonic, ethanesulphonic, hydroxyethanesulphonic, ethylenesulphonic acid; halobenzenesulphonic, toluenesulphonic, naphthalenesulphonic acids or sulphanilic acid; methionine, tryptophan, lysine or arginine.

These or other salts of the new compounds, such as for example the picrates, can also be used for purifying the bases obtained by converting the bases into salts, separating the latter and liberating the bases from the salts again. Owing to the close relationship between the bases in free form and in the form of their salts, there are to be understood as being correspondingly and appropriately included, under the free bases in the foregoing and hereinafter, if required, also the corresponding salts.

The invention also relates to those embodiments of the process in which the starting point is a compound obtainable as intermediate product at any stage and the missing steps of the process are carried out, or the process is discontinued at any stage, or in which a starting material is formed under the reaction conditions or is used in the form of a salt. For the reactions of the invention starting materials are used which yield the above-mentioned preferred compounds.

The starting materials are known, or, if they are new, can be prepared by methods known per se.

The new compounds can be employed as medicaments, for example in the form of pharmaceutical preparations, which contain them in the free form or in the form of their salts in admixture or conjunction with a pharmaceutical organic or inorganic, solid or liquid, carrier suitable for enteral, parenteral or local application. For forming the same there are used substances which do not react with the new compounds, such as, for example, water, gelatine, lactose, starch, magnesium stearate, talc, vegetable oils, benzyl alcohols, gums, polyalkylene glycols, petroleum jelly, cholesterol or other known carriers for medicaments. The pharmaceutical preparations may be in the form, for example, of tablets, dragees, ointments, creams or in liquid form as solutions, suspensions or emulsions. If desired, they are sterilised and/or contain auxiliary substances, such as preserving, stabilizing, wetting or emulsifying agents, salts for altering the osmotic pressure or buffers. They may also contain other therapeutically valuable substances. The preparations are obtained by conventional methods.

The invention is illustrated in the following examples which, however, do not restrict the same.

*Example 1*

A solution of 57.3 grams of 5-(dimethylsulfamyl)-2-nitrobenzoic acid-(N'-methyl-piperazide) in 2500 ml. of ethanol is shaken in the presence of 30 grams of a nickel catalyst (Rupe nickel) in a hydrogen atmosphere until the theoretical quantity of hydrogen has been consumed. The catalyst is then filtered off, the filtrate is concentrated to a volume of 150 ml. and petroleum ether is added to the filtrate. This precipitates 5-(dimethylsulfamyl)-anthranilic acid-(N'-methyl-piperazide) of the formula

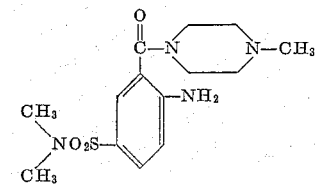

in the form of white crystals having a melting point of 151–152° C. By reacting the same with alcoholic hydrochloric acid, the monohydrochloride with a melting point of 280–282° C. is obtained.

The starting material can be prepared as follows:

To a solution of 80 grams of N-methyl-piperazine in 800 ml. of absolute dioxane which has been cooled to 10° C. there is added drop by drop while stirring a solution of 109 grams of 5-(dimethylsulphamyl)-2-nitrobenzoic acid chloride in 300 ml. of absolute dioxane. The reaction mixture is stirred further for 5 hours at room temperature, water and saturated sodium hydroxide solution are thereupon added thereto and the mixture is extracted with chloroform. The organic phase, washed with water, is dried with magnesium sulphate and evaporated in vacuo. The solid residue is recrystallised from ethanol-petroleum ether and 5-(dimethylsulphamyl)-2-nitrobenzoic acid-(N'-methylpiperazide) having a melting point of 170–172° C. is obtained.

Example 2

A solution of 10 grams of 5-(dimethylsulphamyl)-2-nitrobenzoic acid-[N'-(β-hydroxyethyl)-piperazide] in 100 ml. of ethanol is hydrogenated in the presence of 1 gram of a nickel catalyst (Rupe nickel). After the theoretical quantity of hydrogen has been consumed, the solution is filtered off from the catalyst and the filtrate is evaporated in vacuo. On recrystallisation of the residue from ethanol-petroleum ether, 5-(dimethylsulphamyl)-anthranilic acid-[N'-(β-hydroxyethyl)piperazide] of the formula

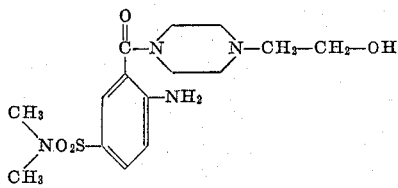

is obtained as colorless crystals having a melting point of 98–100° C. The monohydrochloride melts at 245–247° C.

The starting material can be prepared in the following manner:

To a solution of 9 grams of N-(β-hydroxyethyl)-piperazine in 100 ml. of toluene which has been cooled to 0° C. there is added drop by drop while stirring well a solution of 10 grams of 5-(dimethylsulphamyl)-2-nitrobenzoic acid chloride in 50 ml. of toluene. After the mixture has been stirred for 3 hours at room temperature, the precipitated substance is filtered off, stirred with dilute sodium hydroxide solution and filtered off again. After drying, the substance is crystallised from ethanol and 5-(dimethylsulphamyl) - 2 - nitrobenzoic acid-[N'-(β-hydroxyethyl)-piperazide] having a melting point of 138–139° C. is obtained.

Example 3

14.7 grams of 5-(diethylsulphamyl)-2-nitrobenzoic acid-(N'-methyl-piperazide) are dissolved in 500 ml. of methanol and hydrogenated in the presence of 1 gram of palladium carbon until the absorption of hydrogen ceases. The catalyst is filtered off, the filtrate evaporated under reduced pressure and the residue crystallized from a mixture of ethanol and petroleum ether. The resulting 5-(diethylsulphamyl)-anthranilic acid - (N'-methylpiperazide) of the formula

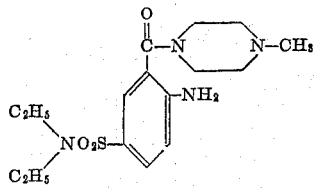

melts at 144–145° C. The hydrochloride melts at 265° C. The 5-(diethylsulphamyl)-2-nitrobenzoic acid-(N'-methylpiperazide) used as starting material may be prepared as follows:

74 grams of 5-(chlorosulphonyl)-2-nitrobenzoic acid are introduced in portions and with stirring into a solution of 280 ml. of diethylamine in 700 ml. of water. The batch is then stirred for 4 hours, active carbon is added, the reaction mixture is filtered, acidified with concentrated hydrochloric acid with ice-cooling. The precipitated substance is dried and then recrystallized from ethyl acetate or benzene and melts at 141–142° C. 35 grams of the so-obtained 5-(diethylsulphamyl)-2-nitrobenzoic acid are converted into 5 - (diethylsulphamyl) - 2-nitro-benzoyl chloride melting at 69–70° C. by being boiled for 3 hours with 300 ml. of thionyl chloride, evaporation and recrystallization from a mixture of benzene and petroleum ether. A solution of 15 grams of this acid chloride in 30 ml. of absolute dioxan is poured, with stirring, into a solution of 8 grams of N-methyl-piperazine in 100 ml. of absolute dioxan, previously cooled to 10° C. The batch is stirred for 3 hours at room temperature, is then treated with water and sodium carbonate solution, extracted with chloroform, the chloroform solution washed with water, dried over magnesium sulphate and evaporated under reduced pressure. The residue is recrystallized from a mixture of ethanol and petroleum ether to yield 5 - (diethylsulphamyl) - 2 - nitrobenzoic acid-(N'-methylpiperazide) melting at 95–96° C.

Example 4

A solution of 8 grams of 5-(dimethylsulphamyl)-2-nitrobenzoic acid-(N'-ethyl-piperazide) in 200 ml. of ethanol is hydrogenated with hydrogen in the pressence of 1 gram of palladium carbon (10%). After the evolution of hydrogen has subsided, the catalyst is filtered off, the solution evaporated under reduced pressure and the residue crystallized from a mixture of ethanol and petroleum ether, 5-(dimethylsulphamyl)-anthranilic acid-(N'-ethyl-piperazide) of the formula

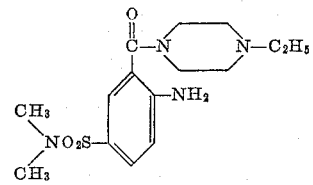

being obtained in the form of white crystals melting at 150–151° C. The hydrochloride melts at 266–267° C.

The 5-(dimethylsulphamyl)-2-nitro-benzoic acid-(N'-ethyl-piperazide) melting at 150–151° C. used as starting material, may be obtained by reacting 5-(dimethylsulphamyl)-2-nitro-benzoyl chloride with N-ethyl-piperazine in absolute dioxan in the presence of triethylamine.

Example 5

A solution of 10 grams of 5-(dimethylsulphamyl)-anthranilic acid-(N'-methyl-piperazide) and 3 ml. of absolute pyridine in 100 ml. of absolute dioxan is cooled to 15° C. and treated dropwise with a solution of 2.65 grams of acetyl chloride in 50 ml. of absolute dioxan. The batch is stirred for 1 hour at room temperature and for 1 hour at 50° C. The reaction suspension is then evaporated under reduced pressure. The residue is dissolved in water, neutralized with sodium bicarbonate and extracted with chloroform. The chloroform residue is recrystallized from a mixture of ethanol and petroleum ether to yield 5-(dimethylsulphamyl)-2-acetylaminobenzoic acid-(N'-methylpiperazide) of the formula

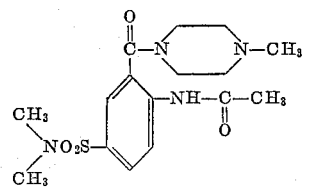

in the form of white crystals melting at 191–193° C.

Example 6

A solution of 10 grams of 5-(dimethylsulphamyl)-anthranilic acid-(N'-methyl-piperazide) and 3 ml. of absolute pyridine in 100 ml. of absolute dioxan is cooled to 15° C. and treated dropwise with a solution of 6 grams of para-chlorobenzoyl chloride in 50 ml. of absolute dioxan. The batch is stirred for 1 hour at room temperature and for 1 hour at 50° C. After cooling, the reaction mixture is filtered, the solid substance extracted with chloroform in the presence of 2 N-sodium hydroxide solution. The chloroform solution is dried over magnesium sulphate and the solvent evaporated; the residue is recrystallized from a mixture of ethanol and methylene chloride to yield 5-(dimethylsulphamyl)-2-(para-chlorobenzoylamino)-benzoic acid-(N'-methyl-piperazide) of the formula

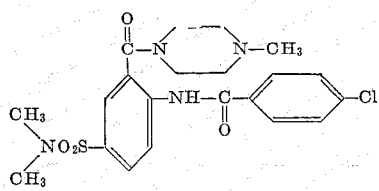

in the form of white crystals melting at 235-237° C.

Example 7

A solution of 7.19 grams of 5-(dimethylsulphamyl)-2-nitrobenzoic acid morpholide in 300 ml. of ethanol is hydrogenated in the presence of 0.5 gram of palladium carbon (10%) until the absorption of hydrogen ceases. The catalyst is filtered off, evaporated under reduced pressure and the residue crystallized from a mixture of ethanol and petroleum ether to yield 5-(dimethylsulphamyl)-anthranilic acid morpholide of the formula

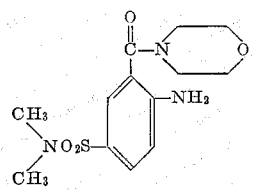

in the form of white crystals melting at 163-165° C.

The 5-(dimethylsulphamyl)-2-nitrobenzoic acid morpholide melting at 204-205° C. used as starting material may be prepared by reacting 5-(dimethylsulphamyl)-2-nitrobenzoyl chloride with morpholine in absolute dioxan.

Example 8

10.5 grams of 5-(dimethylsulphamyl)-2-nitrobenzoic acid piperidide are dissolved in 100 ml. of dimethylformamide and hydrogenated with hydrogen in the presence of 0.5 gram of palladium carbon (10%). After the absorption of hydrogen has ceased, the catalyst is filtered off, the filtrate evaporated under reduced pressure and the residue crystallized from a mixture of alcohol and petroleum ether to yield 5-(dimethylsulphamyl)-anthranilic acid piperidide of the formula

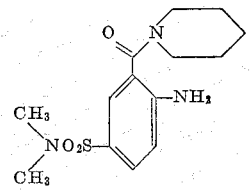

in the form of white crystals melting at 153-154° C.

The 5-(dimethylsulphamyl)-2-nitrobenzoic acid piperidide melting at 177-179° C. used as starting material may be obtained by reacting 2-nitro-5-(dimethylsulphamyl)-benzoyl chloride with piperidine in absolute dioxan.

Example 9

A solution of 10.2 grams of 5-(dimethylsulphamyl)-2-nitrobenzoic acid diethylamide in 300 ml. of absolute ethanol is hydrogenated in the presence of 1 gram of palladium carbon (10%) until the absorption of hydrogen ceases. The catalyst is filtered off, the solution evaporated under reduced pressure and the residue crystallized from a mixture of ethanol and petroleum ether to yield 5-(dimethylsulphamyl)-anthranilic acid diethylamide of the formula

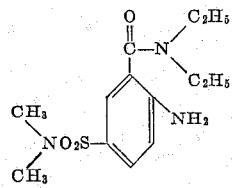

in the form of white crystals melting at 125-127° C.

The 5-(dimethylsulphamyl)-2-nitrobenzoic acid diethylamide melting at 138-140° C. used as starting material may be obtained by reacting 5-(dimethylsulphamyl)-2-nitrobenzoyl chloride with diethylamine in absolute dioxan.

Example 10

A solution of 11.5 grams of 2-nitro-5-(dimethylsulphamyl)-benzoic acid-[N-ethyl-N-(β-dimethylaminoethyl)-amide] hydrochloride in 100 ml. of ethanol and 50 ml. of water is hydrogenated with hydrogen in the presence of 0.5 gram of palladium carbon (10%). After the absorption of hydrogen ceases, the solution is filtered, evaporated and the residue taken up in water. The solution is rendered alkaline with ammonia, extracted with methylene chloride and evaporated under reduced pressure. The oily residue becomes solid on being allowed to stand and is recrystallized from a mixture of alcohol and petroleum ether to yield 5-(dimethylsulphamyl)-anthranilic acid-[N-ethyl-N-(β-dimethylamino-ethyl)-amide] of the formula

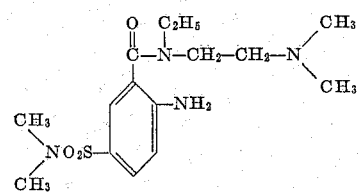

in the form of crystals melting at 137-138° C.

The 2-nitro-5-(dimethylsulphamyl)-benzoic acid-[N-ethyl-N-(β-dimethylamino-ethyl)-amide] hydrochloride melting at 198-200° C. used as starting material may be prepared by reacting 5-(dimethylsulphamyl)-2-nitrobenzoyl chloride with N-ethyl(β-dimethylamino-ethyl)-amine in absolute dioxan and treating the resulting basic oil with alcoholic hydrochloric acid.

Example 11

3.2 grams of anhydro-[N-acetyl-5-(dimethylsulphamyl)-anthranilic acid](6-(dimethylsulphamyl)-2-methyl-4H-3:1 benzoxazine-4-one) are boiled under reflux in the presence of 10 ml. of N-methyl-piperazine for 16 hours. The reaction mixture is evaporated under reduced pressure and the residue taken up in 2 N hydrochloric acid. After about 30 minutes the hydrochloric acid layer is rendered alkaline with ammonia and extracted with methylene chloride. The residue is recrystallized from a mixture of ethanol and petroleum ether to yield 5-(dimethylsulphamyl)-anthranilic acid-(N'-methyl-piperazide) melting at 151-152° C. which is identical with the product obtained according to Example 1.

The anhydro-[N-acetyl-5-(dimethylsulphamyl)-anthranilic acid] used as starting material may be prepared as follows:

4.5 grams of 5-(dimethylsulphamyl)-anthranilic acid are heated in the presence of 20 ml. of acetic anhydride for 2 hours at 100-105° C. The reaction mixture is cooled to room temperature and the precipitated crystals filtered off; M.P. 186-188° C. The resulting crude product may be used directly for the above mentioned reaction.

Example 12

2 grams of 5-(dimethylsulphamyl)-isatoic anhydride are boiled under reflux in the presence of 20 ml. of N-methylpiperazine for 16 hours. The reaction mixture is then evaporated under reduced pressure, the residue taken up in 2 N hydrochloric acid and extracted with ethyl acetate. The hydrochloric acid aqueous layer is rendered alkaline with ammonia and extracted with methylene chloride. The solid residue is recrystallized from a mixture of ethanol and petroleum ether to yield 5-(dimethylsulphamyl)-anthranilic acid-(N'-methylpiperazide) melting at 151–152° C. which is identical with the products described in Examples 1 and 11.

Example 13

2 grams of 5-(dimethylsulphamyl)-isatoic anhydride are boiled under reflux in the presence of 20 ml. of morpholine for 16 hours. The reaction mixture is then evaporated under reduced pressure, water and glacial acetic acid are added until the reaction mixture is acidic, the latter is neutralized with sodium bicarbonate and extracted with ethyl acetate. The ethyl acetate residue is recrystallized from a mixture of ethanol and petroleum ether to yield 5 - (dimethylsulphamyl) - anthranilic acid morpholide melting at 163–165° C. which is identical with the product described in Example 7.

The 5-(dimethylsulphamyl)-isatoic anhydride used as starting material may be prepared as follows:

15 grams of 2-amino-5-(dimethylsulphamyl)-benzoic acid are boiled under reflux in the presence of 90 ml. of chloroformic acid ethyl ester for 40 hours. The reaction mixture is cooled and the precipitated crystals melting at 215–216° C. filtered off and immediately worked up as described above.

Example 14

A solution of 6.5 g. of 5-(dimethylsulfamyl)-2-nitrobenzoic acid-[di-(β-hydroxyethyl)-amide] in 80 ml. of dimethylformamide is hydrogenated in the presence of 0.5 g. of palladium carbon (10%) at 40° C. under atmospheric pressure until the uptake of hydrogen ceases. The catalyst is filtered off and the filtrate evaporated under reduced pressure. The residue is recrystallized from ethanol+petroleum ether and the 5-(dimethylsulfamyl)-anthranilic acid-[di-(β-hydroxyethyl)-amide] of formula

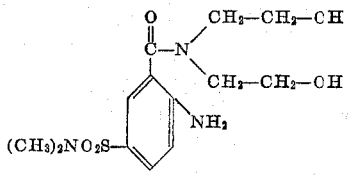

obtained in the form of colorless crystals melting at 126–127° C.

The 5-(dimethylsulfamyl)-2-nitro-benzoic acid-[di-(β-hydroxyethyl)-amide] used as starting material is obtained by reacting 5-(dimethylsulfamyl)-2-nitro-benzoyl-chloride with diethanolamine in dioxane. After recrystallization from a mixture of alcohol and petroleum ether it melts at 140–141° C.

Example 15

| | Mg. |
|---|---|
| 5-(dimethylsulphamyl)-anthanilic acid-(N'-methyl-piperazide) | 300 |
| Wheat starch | 95 |
| Aerosil comp. | 22 |
| Arrowroot | 19 |
| Magnesium stearate | 2 |
| Talcum | 12 |
| | 450 |

Alcohol 70%, q.s.

The active substance, the wheat starch, and the Aerosil comp. are thoroughly mixed and moistened with sufficient 70% alcohol to produce a slightly plastic mass ready for granulation.

The mixture is passed through a 2 mm. mesh sieve and dried at 45° C. (residual moisture 1%). The resulting granulate is given an average grain size of about 0.5 mm., then mixed with arrowroot, magnesium stearate, and talcum. This mixture is compressed into tablets of 450 mg. in the usual manner.

Example 16

In an analogous manner to that described Examples 1 to 4, 7 to 10 and 14 there may be prepared (a) From 5-(diethylsulfamyl)-2-nitro-3-methylbenzoic acid diallylamide the 5-(diethylsulfamyl)-3-methyl-anthranilic acid diallylamide, (b) From 5 - (diethylsulfamyl)-2-nitro-4-ethoxy-benzoic acid [di-(β-methoxyethyl)-amide] the 5-(diethylsulfamyl - 4 - ethoxy-anthanilic acid [di-(β-methoxyethyl)-amide], (c) From 5 - (diethylsulfamyl) - 2 - nitro - 3-trifluoromethyl-benzoic acid thiamorpholide the 5-(diethylsulfamyl)-3-trifluoromethyl-anthranilic acid thiamorpholide, (d) From 5-(dimethylsulfamyl)-2-nitro-4-chloro-benzoic acid [di-(β-aminoethyl)-amide] the 5-(dimethylsulfamyl) - 4 - chloro-anthranilic acid [di-(β-aminoethyl)-amide] and (e) From 5-(dimethylsulfamyl)-2-nitro-benzoic acid [di - (β - methylaminoethyl)-amide] the 5-(dimethylsulfamyl) - anthranilic acid [di - (β - methylaminoethyl)-amide].

In an analogous manner to that described in Examples 5 and 6 there may be prepared (a) From 5-(dimethylsulfamyl)-anthanilic acid-(N'-methylpiperazide) and carbethoxy-chloride, phenylacetyl chloride or meta-trifluoromethylbenzoyl chloride the 5-(dimethylsulfamyl)-2-(carbethoxyamino) - benzoic acid (N' - methylpiperazide), the 5 - (dimethylsulfamyl) - 2-(phenyl - acetylamino) - benzoic acid (N'-methyl-piperazide) and the 5-(dimethylsulfamyl)-2-(meta-trifluoromethylbenzoylamino) - benzoic acid (N' - methylpiperazide) respectively, (b) From 5-(dimethylsulfamyl)-anthranilic acid morpholide and ortho-tolylacetyl chloride or meta-methoxybenzoyl chloride the 5-(dimethylsulfamyl)-2-(orthotoyl-acetylamino)-benzoic acid morpholide and 5-(di-methylsulfamyl)-2-(meta-methoxybenzoylamino)-benzoic acid morpholide respectively.

What is claimed is:

1. A member selected from the group consisting of compounds of the formula

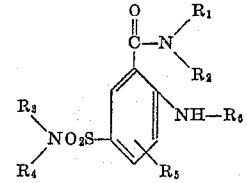

in which $R_1$ and $R_2$ each stands for a member selected from the group consisting of lower alkyl, lower alkenyl, lower alkoxyalkyl, lower alkylmercaptoalkyl, mono-lower alkylamino-lower alkyl, di-lower alkylamino-lower alkyl, lower hydroxyalkyl, lower aminoalkyl and, when taken together $R_1$ and $R_2$ stand for a member selected from the group consisting of lower alkylene, 3-oxapentylene-(1,5) and 3-thiapentylene-(1,5), $R_3$ and $R_4$ each stands for lower alkyl, $R_5$ stands for a member selected from the group consisting of hydrogen, halogen, trifluoromethyl, lower alkyl and lower alkoxy and $R_6$ stands for a member selected from the group consisting of hydrogen, carbo-lower alkoxy, lower alkanoyl, phenyl-lower alkanoyl, benzoyl, and phenyl-lower alkanoyl and benzoyl substituted in the phenyl nuclei by a member selected from the group consisting of lower alkyl, lower alkoxy, halogen and trifluoromethyl, and the acid addition salts of these compounds.

2. A member selected from the group consisting of compounds of the formula

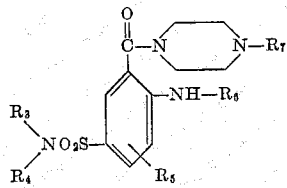

in which $R_3$ and $R_4$ each stands for lower alkyl, $R_5$ stands for a member selected from the group consisting of hydrogen, halogen, trifluoromethyl, lower alkyl and lower alkoxy and $R_6$ stands for a member selected from the group consisting of hydrogen, carbo-lower alkoxy, lower alkanoyl, phenyl-lower alkanoyl, benzoyl, and phenyl-lower alkanoyl and benzoyl substituted in the phenyl nuclei by a member selected from the group consisting of lower alkyl, lower alkoxy, halogen and trifluoromethyl, and $R_7$ stands for a member selected from the group consisting of hydrogen, lower alkyl and hydroxy-lower alkyl, and the acid addition salts of these compounds.

3. A member selected from the group consisting of a compound of the formula

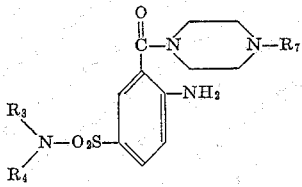

in which $R_3$ and $R_4$ stand for lower alkyl and $R_7$ stands for a member selected from the group consisting of lower alkyl and hydroxy-lower alkyl and an acid addition salt thereof.

4. A member selected from the group consisting of a compound of the formula

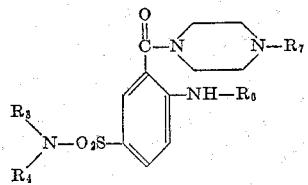

in which $R_3$, $R_4$ and $R_7$ stand for lower alkyl and $R_6$ for lower alkanoyl, and an acid addition salt thereof.

5. A compound of the formula

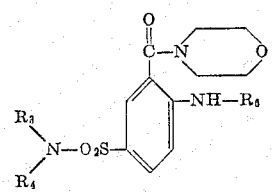

in which $R_3$ and $R_4$ stand for lower alkyl and $R_6$ for a member selected from the group consisting of hydrogen and lower alkanoyl.

6. A member selected from the group consisting of 5 - (dimethylsulphamyl) - anthranilic acid - (N′ - methyl-piperazide) and an acid addition salt thereof.

7. A member selected from the group consisting of 5 - (dimethylsulphamyl) - anthranilic acid - [N′ - (β - hydroxyethyl)-piperazide] and an acid addition salt thereof.

8. A member selected from the group consisting of 5 - (diethylsulphamyl) - anthranilic acid - (N′ - methyl-piperazide) and an acid addition salt thereof.

9. A member selected from the group consisting of 5 - (dimethylsulphamyl) - anthranilic acid - (N′ - ethyl-piperazide) and an acid addition salt thereof.

10. A member selected from the group consisting of 5 - (dimethylsulphamyl) - 2 - acetylaminobenzoic acid-(N′-methyl-piperazide) and an acid addition salt thereof.

11. A member selected from the group consisting of 5 - (dimethylsulphamyl) - 2 - (para-chlorobenzoylamino)-benzoic acid-(N′-methyl-piperazide) and an acid addition salt thereof.

12. 5 - (dimethylsulphamyl) - anthranilic acid-morpholide.

13. 5 - (dimethylsulphamyl) - anthranilic acid - piperidide.

14. 5 - (dimethylsulphamyl) - anthranilic acid diethylamide.

15. A member selected from the group consisting of 5 - (dimethylsulphamyl) - anthranilic acid [N′-ethyl-N-(β-dimethylamino-ethyl)amide] and an acid addition salt thereof.

16. 5 - (dimethylsulphamyl) - anthranilic acid [N - di-(β-hydroxyethyl)-amide].

References Cited by the Examiner
FOREIGN PATENTS
882,090  11/1961  Great Britain.
907,847  10/1962  Great Britain.

ALEX MAZEL, *Primary Examiner.*

J. TOVAR, *Assistant Examiner.*